United States Patent [19]
Bass

[11] Patent Number: 4,973,811
[45] Date of Patent: Nov. 27, 1990

[54] IN SITU DECONTAMINATION OF SPILLS AND LANDFILLS BY RADIO FREQUENCY INDUCTION HEATING

[75] Inventor: Ronald M. Bass, Houston, Tex.

[73] Assignee: Shell Oil Company, Houston, Tex.

[21] Appl. No.: 444,574

[22] Filed: Nov. 30, 1989

[51] Int. Cl.$^5$ .......................... H05B 6/10; E21B 43/24
[52] U.S. Cl. .............................. 219/10.57; 219/10.41; 219/10.81; 166/60; 166/248; 299/14; 405/131
[58] Field of Search ................ 219/10.55 R, 10.55 A, 219/10.81, 10.57, 10.41, 10.79; 166/248, 60; 299/14, 5, 6; 405/131

[56] References Cited

U.S. PATENT DOCUMENTS

| | | | |
|---|---|---|---|
| Re. 30,738 | 9/1981 | Bridges et al. | 219/10.81 |
| 4,116,273 | 9/1978 | Fisher et al. | 166/248 |
| 4,320,801 | 3/1982 | Rowland et al. | 166/248 |
| 4,485,869 | 12/1984 | Sresty et al. | 166/248 |
| 4,670,634 | 6/1987 | Bridges et al. | 219/10.41 |

Primary Examiner—Philip H. Leung

[57] ABSTRACT

An RF transmission line is located horizontal to the surface of a region of earth to be decontaminated. The transmission line is driven by a constant current RF source thereby causing induction heating of the soil therebeneath. An array of transmission lines may be required depending upon the size of the area to be decontaminated. The array may be moved slowly along tracks or other mobile carrier, in a direction horizontal to the earth's surface and perpendicular to the transmission line in order to achieve more uniform heating. In an alternative embodiment, a second array may be interspersed with the first array and the RF source switched between the arrays to achieve more uniform heating. Heat losses from recondensation of vapors at the surface and/or from radiation may be reduced by heating the air used for removing the vapors and by providing a radiant surface above the array and heating said array to the desired target temperature.

19 Claims, 3 Drawing Sheets

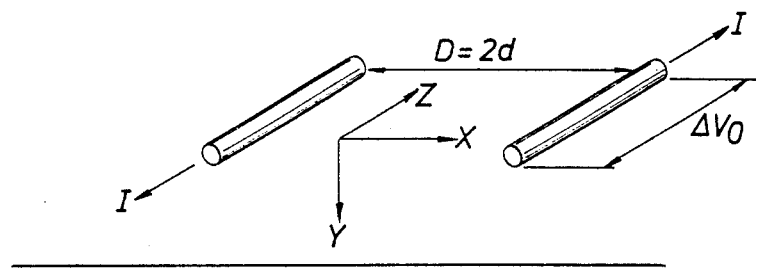
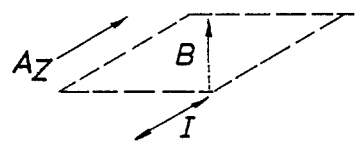
FIG. 5
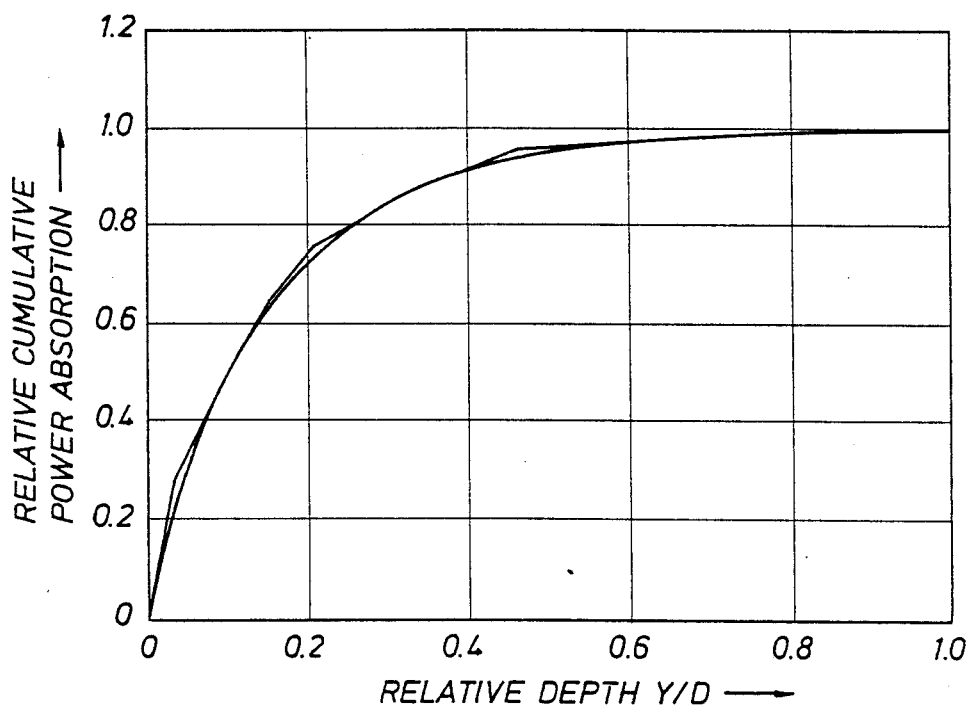
FIG. 6
FIG. 7
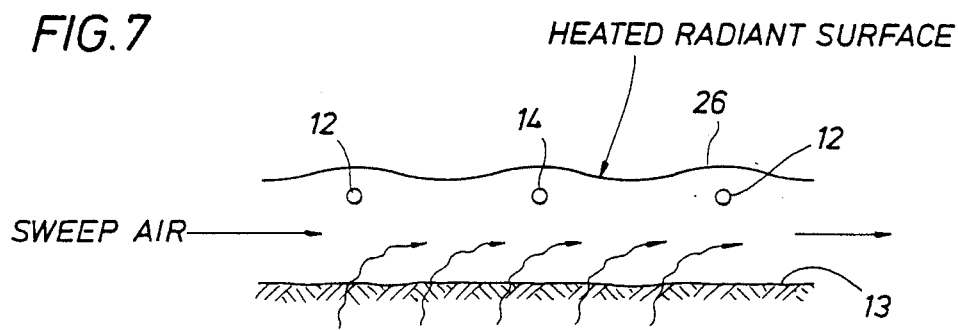

IN SITU DECONTAMINATION OF SPILLS AND LANDFILLS BY RADIO FREQUENCY INDUCTION HEATING

FIELD OF THE INVENTION

This invention relates generally to the decontamination of spills and landfills and more particularly to such decontamination in situ using radio frequency induction heating.

BACKGROUND OF THE INVENTION

Hazardous waste materials have been improperly deposited in thousands of sites all over the United States and, indeed, all over the world. Uncontrolled landfills have been used as convenient, but inadequate, disposal sites for industrially generated wastes while other sites have been contaminated by accidental spills of hazardous materials. There are many sites where hazardous materials were spilled prior to the discovery of the hazardous nature of the materials being handled. Many hazardous materials found at these sites are stable, do not undergo environmental degradation at reasonably fast rates, have high boiling points, are considered toxic at very low concentration levels, and bio-accumulate in various species of the food chain at concentrations higher than that found in the environment.

Complete reclamation or isolation of such sites is preferred but the cost associated with site disturbance by available methods has been considered prohibitive. The treatment of contaminated soil from such sites in an incinerator has not been a practical solution for several reasons including the high cost of excavation and incineration, shortage of incineration capacity, inadequate methods and capacity for ash disposal in the incinerators, and the hazards and risks associated with site disturbance and transportation. The treatment of uncontrolled landfills and spills would benefit from an in situ process that eliminates or alleviates these disadvantages and risks. Radio frequency (RF) heating applied in accordance with the present invention offers a viable in situ method for treatment of contaminated sites.

The term "RF" refers to frequencies used in wireless communication and represents a wide frequency range from 45 Hz to 10 gigahertz (GHz). However, the frequencies of interest for in situ soil heating lie principally between 0.5 to 45 MHz. For dry soils, in this frequency range, dipolar molecules absorb electromagnetic (EM) energy which is converted to heat due to dipole rotation and molecular vibration. This is known as dielectric heating. The absorption of EM energy and conversion to heat occurs throughout the volume of the material and is not dependent on the relatively slow process of thermal conduction. The amount of energy dissipated in the heated soil is proportional to the dielectric constant, the loss tangent, frequency and the square of the field strength of the applied electromagnetic energy. The penetration depth of the applied fields is inversely related to frequency and to the conductivity of the soil. Thus, for any given soil, frequency may be selected to provide the required penetration depth. Penetration of EM energy of a few to more than 50 meters can typically be achieved.

In situ heating of earth formations by high-frequency displacement currents (dielectric heating) is well known, particularly in the production of petroleum products such as shale oil. Alternatively, heating by conduction currents at relatively low frequencies is also possible, but such heating is limited to earth that remains conductive, generally requiring the presence of water and, hence, operating at relatively low temperatures below the boiling point of water or requiring maintenance of pressure. Conduction heating at very high temperatures for the immobilization of radioactive components in soil is shown in Brouns et al., U.S. Pat. No. 4,376,598, where conductive material was added to the soil to assure conduction, and the soil was heated to vitrification at temperatures as high as 1500° C., whereat radioactive contaminants are fused with the silicates in the soil to form a glass or similar product which, upon cooling, forms a stable mass.

In situ heating of earth formations with RF for hydrocarbon production is shown in Bridges et al, U.S. Pat. No. Re. 30,738 and Kasevich et al U.S. Pat. No. 4,140,179. The former discloses the use of RF from a "tri-plate" line buried in the earth to heat a block of earth formations uniformly by displacement currents, leading to dielectric heating. The latter discloses radiating RF energy into the earth. In U.S. Pat. No. 4,670,634 a portion of the earth near the surface is decontaminated by selective heating with RF energy from a transmission line array to which the RF energy is bound. That is, there is substantially no radiation from the bound-wave fringing-field transmission line excitor.

Existing RF heating methods, such as the above-referenced fringe field or tri-plate methods, suffer from high impedance coupling, and high voltages must be used to achieve moderate heating rates. Consequently, typical treatment times may be on the order of months to achieve the desired temperature. This is especially the case when water, or a water-based solution, has been added to the soil to enhance the treatment. The electrical breakdown of air determines the theoretical upper limit of voltage which can be applied; however, lower practical limits may be set by RF generator and transmission component limitations and resistive losses.

Referring now to FIG. 1, the prior art bound-wave fringing fields applicator 10 (shown in the '634 patent) consists of a set of parallel electrodes 12, 14 located above the earth's surface 13 to which alternating voltages are applied (the same voltage between each adjacent pair, with alternating polarity). Lines 11 represent lines of displacement current expected where the deposit is relatively dry near the horizontal wire pairs 12, 14. In this method, little heating occurs directly under each electrode. Therefore, to make the heating more uniform, the power may be switched periodically to interspersed electrodes. Heating is dependent entirely upon the electric field established.

Referring now to FIG. 2, the "tri-plate" transmission line applicator 15 (U.S. Re 30,738) used for the production of hydrocarbons may be modeled in a similar fashion to the fringe field applicator 10 of FIG. 1 and includes spaced outer parallel conductors 16, 18 and a central parallel conductor 17 therebetween. The conductors 16, 17, 18 may be, for example, rows of pipes. Excitation by an RF source 19, as between the central conductor 17 and the outer conductors 16, 18, establishes a fairly well confined electric field. Because heating rates are very high near the conductors, the regions near the conductors will quickly dry out and function like the air gaps in the fringe field applicator. Thus the "tri-plate" applicator 15 of FIG. 2 performs in a manner similar to the fringe field applicator 10 of FIG. 1 and has the additional disadvantage of having to be inserted into the earth. In addition, for shallow treatments, substantial fringing will occur from the bottom of the "tri-plate" conductors unless they are more closely spaced than the depth of treatment.

SUMMARY OF THE INVENTION

The improvement of the present invention utilizes a different coupling scheme, called "eddy current" or "inductive" coupling which makes use of the magnetic field established rather than the electric fields as disclosed in the prior art systems above-described. A current generator is used to drive a transmission line which is shorted at the opposite ends. This method is much better suited to heating highly conductive soils than the fringe field method, and much higher heating rates can be achieved with moderate applicator voltages.

BRIEF DESCRIPTION OF THE DRAWINGS

FIG. 5 is a model of the soil current density of the Eddy Current Model.

FIG. 6 is a graph depicting the cumulative power absorption of the Eddy Current and Fringe Field Applicators.

FIG. 7 is a schematic of an alternate embodiment.

DETAILED DESCRIPTION OF PREFERRED EMBODIMENTS

The low coupling capacitance of the prior art fringe field applicator imposes strict limitations on heating rates. A technique more suitable to coupling into a moderately or highly conductive medium is the eddy current or inductive method.

Figure 1:
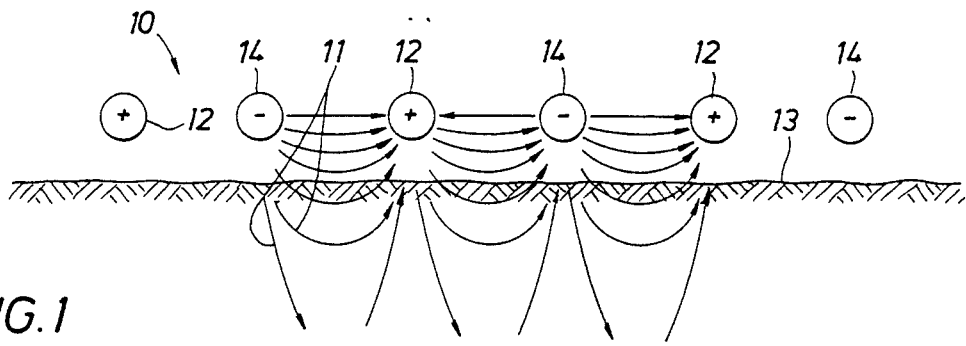
FIG. 1 is a schematic of the prior art Fringe Field Applicator.
Figure 2:
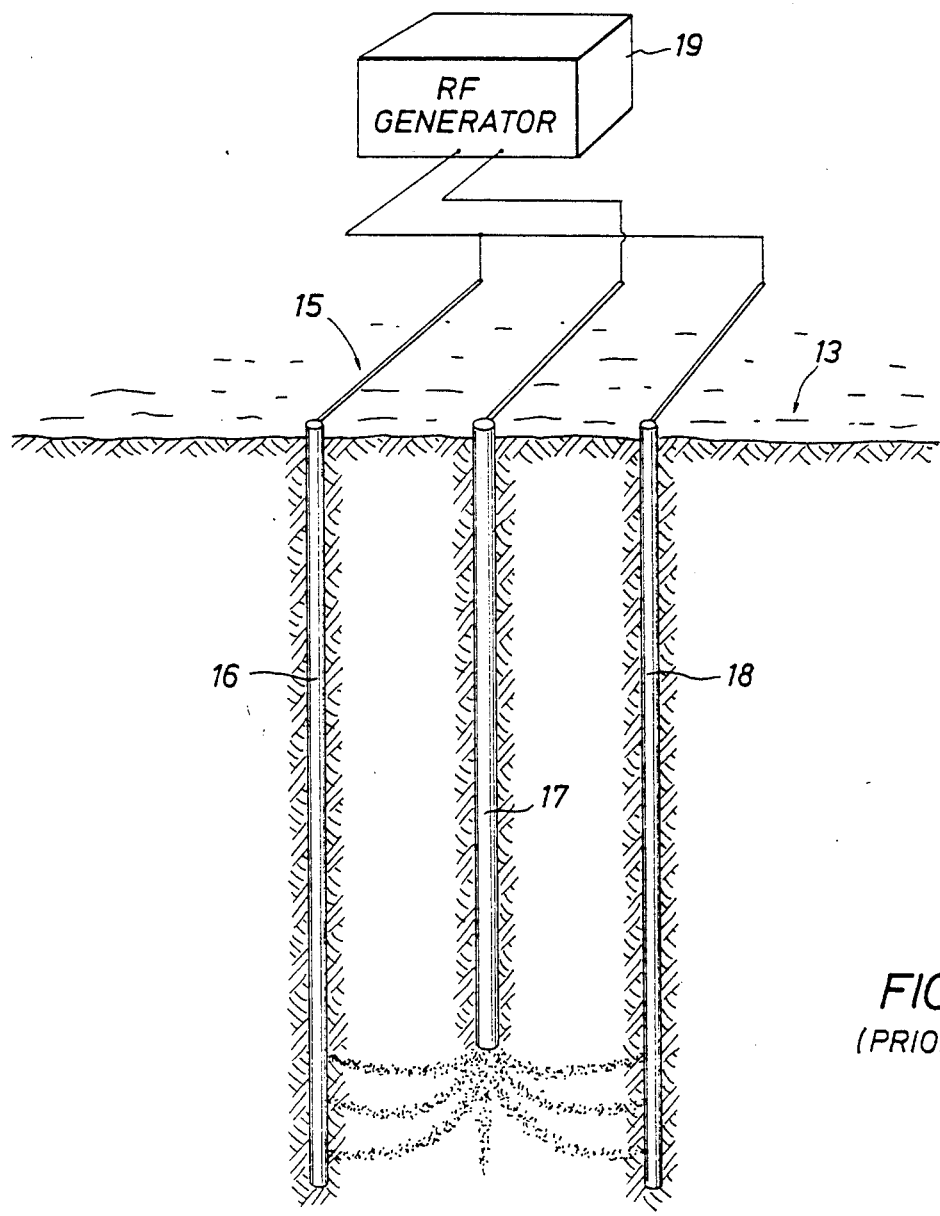
FIG. 2 is a schematic of the prior art Tri-Plate Applicator.
Figure 3:
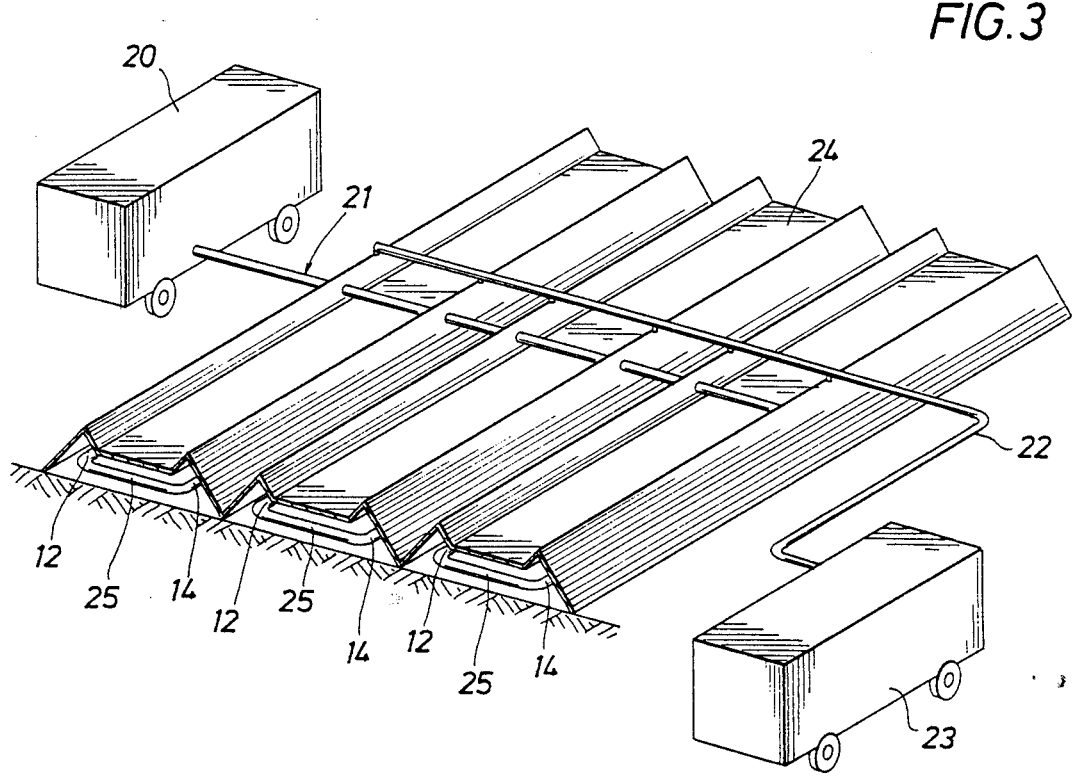
FIG. 3 is a schematic representation of a typical configuration for practicing the present invention.

FIG. 3 shows a typical configuration for using the apparatus and method of the invention in situ. For purposes of this invention the term "in situ" is also intended to include the application wherein soil is excavated from one location and moved to another location where it is treated "in situ". RF energy from a constant current RF source 20 is supplied to the electrodes 12, 14 via transmission line 21, generating strong magnetic fields and causing induced (eddy) currents to heat up the adjacent soil and liquids and thereby driving liquids and vapors therefrom. As shown in the prior art system described above, the resulting liquids and vapors are collected by appropriate ducts 22 and conveyed to (for example) a mobile treatment system 23. A vapor barrier 24 is used to confine the gas and vapor for collection.

Figure 4:
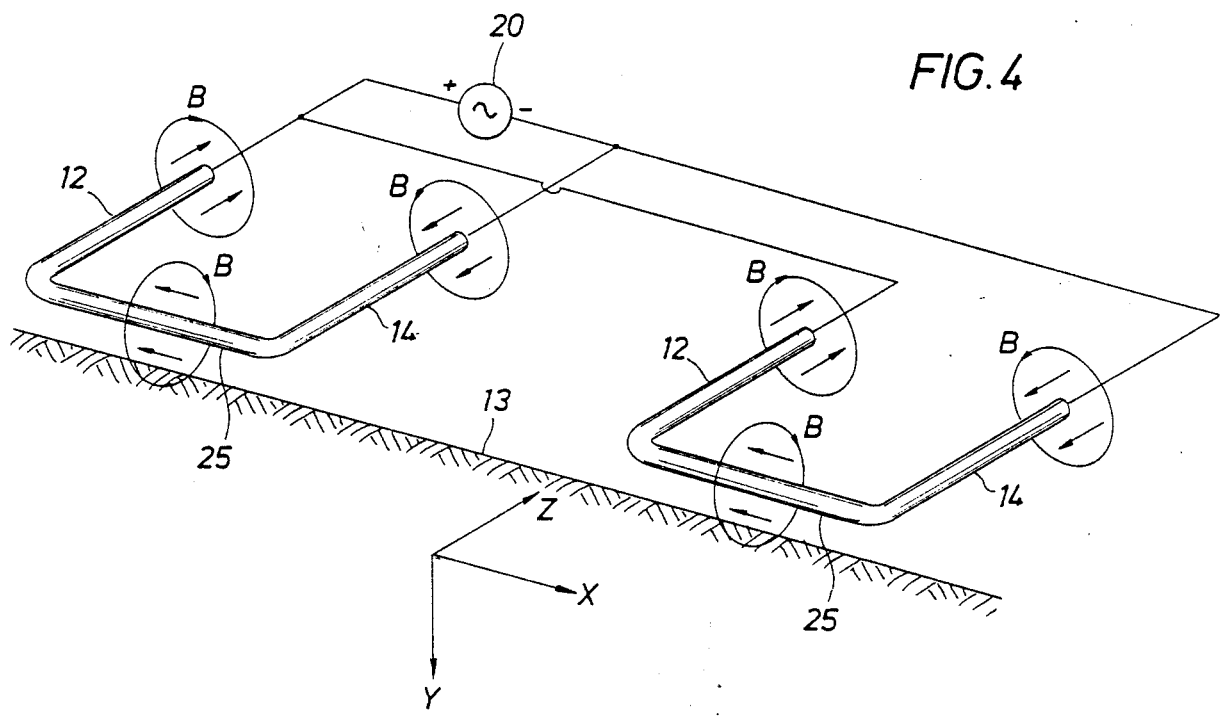
FIG. 4 is a schematic of the Eddy Current Applicator showing the magnetic field established.

The eddy current applicator of the present invention is shown schematically in FIG. 4. One end of each electrode pair 12, 14 is connected to an electrically common point (i.e., shorted together as shown by shorting bar 25), thereby forming a low impedance load which is impedance-matched by a constant current generator 20, the RF source.

The prior art systems utilize the high electric fields produced, the magnetic fields being negligible, whereas the present invention is diametrically opposed.

An array of electrodes 12, 14, similar to the fringe field array, is driven with high currents from RF source 20 to achieve much higher magnetic fields B than is possible with moderate voltages applied to the fringe field array. In practice, this may be accomplished by shorting the ends of the array (as by shorting bar 25) and driving the array with the low impedance RF source 20. A more uniform heating in the x-direction could be accomplished by array-switching or, preferably, by slowly moving the entire array in the x-direction. A track or other mobile system (not shown) would be required for the latter embodiment. Of course, the supporting frame must be non-metallic and any conductive wheels, bearings, etc., must be located outside the effective heating area of the array.

The potential equations for a single electrode pair in a homogeneous medium may be developed using the model shown in FIG. 5. Currents in the soil flow only in the direction Z of the electrodes (except at the shorted ends). Also, except near the ends of the array, the vector magnetic potential has a nonzero component only in the Z-direction. From Maxwell's equations, the relations among voltage, current and potential are as follows:

$$\phi E \cdot dl = 2\sigma i_Z = -\frac{\partial \phi}{\partial t} = -\frac{\partial}{\partial t} \int_S B \cdot dS = \quad (1)$$

$$-\frac{\partial}{\partial t} \phi A \cdot dl = -\frac{\partial}{\partial t} 2A_z$$

or $$2\sigma|i| = |\omega A_Z| \quad (2)$$

$$A_Z = \frac{I\mu}{4\pi} \ln \left| \frac{(X+d)^2 + Y^2}{(X-d)^2 + Y^2} \right| \quad (3)$$

or $$\frac{\text{Power}}{m^3} = \frac{i^2}{\sigma} \quad (4)$$

where:
  $\sigma$ is the soil conductivity, mhos/m
  $i_Z$ is the Z component of soil current density, amps/m$^2$ (all other components are zero away from ends of electrodes)
  $\phi$ is the magnetic flux, Webers
  B is the magnetic induction, Webers/m$^2$
  A is the vector magnetic potential, Weber/m
  $A_Z$ is the component of magnetic potential in the Z direction, Weber/m
  $\omega$ is the angular frequency, radians/sec
  I is the current, amps
  $\mu$ is the magnetic permeability, Henries/m and
  d is one-half the distance between electrodes.

As with the fringe field model, the potential model for the eddy current array is built up from superposition of potentials from pairs of electrodes 12, 14.

Cumulative power absorption vs. relative depth (Y/D) is shown in FIG. 6 for both fringe field and eddy current arrays, for the dimensions used in case studies. The curves are nearly identical. Somewhat arbitrarily, the effective heating depth was selected as depth/separation (Y/D)=0.2, where 75 percent of the cumulative power is deposited and the heating rate averaged in the x-direction is ⅓ of its value at the surface.

The relative heating rates between adjacent electrodes may be improved by switched, interspersed electrodes. Separation D is defined as the distance between excited electrodes (every other electrode). Although the pattern is improved compared to not switching, heating is still much higher directly under the electrodes than at other locations. Over several month's time, thermal diffusion will smooth out heating nonuniformities over a distance of a few feet. Qualitatively, for each method considered, heating and drying proceed accordingly. For fixed or switched arrays, fringe field or eddy current, heating will occur preferentially near the electrodes. The pattern will be smoother for a switched array than for a fixed array. A mobile array will further improve the heating and drying pattern.

Because heating is nonuniform with depth, a dry layer will develop at the surface after heating for some time. The dry layer introduces additional coupling impedance for the fringe field method thereby greatly reducing the heating rate. The inductive method does not have this problem.

If decontamination requires complete drying of the soil, the best method may be to start with inductive heating, then switch to fringe field heating when the soil becomes sufficiently dry. This requires only an adjustment of the impedance matching network (not shown) between the RF generator and the array, and changing the electrode termination from shorted to open condition. Measures may be required to prevent recondensation of vapors at the surface and/or prevent heat loss to atmosphere. Two methods of accomplishing this are shown in FIG. 7. The first method is to heat the air (sweep air) used to recover the vapors. The second method is to install a radiant surface 26 above the array and heat this surface, by external means, to the desired target soil temperature. Of course, a combination of these methods may also be used. The vapor barrier 24 has been omitted for clarity.

Eddy current or inductive heating, the invention described here, can achieve much faster heating times than fringe field heating. It has a higher thermal efficiency and can yield much faster cleanup of a site.

What is claimed is:

1. A system for the in situ decontamination of a region at or near the surface of the earth which region has been contaminated with a hazardous material comprising:
   a transmission line excitor disposed on the surface of a region of contaminated earth, said transmission line being shorted at one end;
   a source of radio frequency energy for driving said transmission line;
   means for coupling said radio frequency energy source to said transmission line thereby generating eddy current heating of said contaminated earth; and
   means for collecting vaporized fluid materials which may be driven from said contaminated earth by said heating.

2. The system of claim 1 wherein said source of radio frequency energy is a constant current source.

3. The system of claim 1 further comprising means for moving said transmission line in a horizontal direction perpendicular to its length.

4. The system of claim 1 wherein said excitor comprises a plurality of transmission lines forming a first array.

5. The system of claim 4 further comprising a second excitor array of transmission lines interspersed between said first array.

6. The system of claim 5 further comprising switching means for alternately energizing said first and second arrays with said radio frequency source.

7. The system of claim 4 further comprising means for moving said first array in a horizontal direction perpendicular to its length.

8. A system for the in situ decontamination of a region at or near the surface of the earth which region has been contaminated with a hazardous material comprising:
   a transmission line excitor array disposed on the surface of a region of contaminated earth, said array being comprised of a plurality of transmission line excitors each of said transmission line excitors being shorted at one end;
   a source of radio frequency energy for driving said transmission line excitors;
   means for coupling said radio frequency energy source to said transmission line excitors thereby generating eddy current heating of said contaminated earth;
   means for collecting vaporized fluid materials which may be driven from said contaminated earth by said heating; and
   means for heating said array to substantially a desired temperature.

9. The system of claim 8 wherein said source of radio frequency energy is a constant current source.

10. The system of claim 8 further comprising means for moving said transmission line in a horizontal direction perpendicular to its length.

11. The system of claim 8 wherein said excitor comprises a plurality of transmission lines forming a first array.

12. The system of claim 11 further comprising a second excitor array of transmission lines interspersed between said first array.

13. The system of claim 12 further comprising switching means for alternately energizing said first and second arrays with said radio frequency source.

14. The system of claim 11 further comprising means for moving said first array in a horizontal direction perpendicular to its length.

15. A method of in situ decontamination of a region at or near the surface of the earth which region has been contaminated with a hazardous material comprising the steps of:
   installing a transmission line excitor adjacent to said region, said transmission line being shorted at one end;
   connecting said transmission line to a source of radio frequency energy;
   coupling said radio frequency energy source to said transmission line thereby generating eddy current heating of said region; and
   collecting vaporized fluid materials which may be driven from said region by said heating.

16. The method of claim 15 wherein said source of radio frequency energy is a constant current source.

17. The method of claim 15 comprising the additional step of moving said transmission line in a horizontal direction perpendicular to its length.

18. The method of claim 15 wherein said excitor comprises a plurality of interspersed transmission lines.

19. The method of claim 18 wherein said interspersed transmission lines are switched.

* * * * *